(12) United States Patent
Guckert et al.

(10) Patent No.: US 7,520,953 B2
(45) Date of Patent: Apr. 21, 2009

(54) PROCESS FOR PRODUCING MOLDINGS OF EXPANDED GRAPHITE, PROCESS FOR CONDUCTING, EXCHANGING OR STORING HEAT USING MOLDINGS AND PROCESS FOR PRODUCING A HEAT STORAGE DEVICE

(75) Inventors: Werner Guckert, Baar (DE); Wolfgang Kienberger, Thierhaupten (DE)

(73) Assignee: SGL Carbon AG, Wiesbaden (DE)

( * ) Notice: Subject to any disclaimer, the term of this patent is extended or adjusted under 35 U.S.C. 154(b) by 326 days.

(21) Appl. No.: 11/083,653

(22) Filed: Mar. 18, 2005

(65) Prior Publication Data

US 2005/0230038 A1  Oct. 20, 2005

(30) Foreign Application Priority Data

Apr. 16, 2004  (EP) .................................. 04009091

(51) Int. Cl.
*B32B 37/00* (2006.01)
(52) U.S. Cl. ........................................ 156/267; 156/276
(58) Field of Classification Search ................. 156/276, 156/280, 250, 267, 306.3
See application file for complete search history.

(56) References Cited

U.S. PATENT DOCUMENTS

| 3,404,061 | A |   | 10/1968 | Shane et al. |
| 3,475,244 | A | * | 10/1969 | Sanders, Jr. .................... 156/83 |
| 3,492,197 | A | * | 1/1970 | Bonorden et al. ............ 428/412 |
| 3,502,759 | A | * | 3/1970 | Olstowski et al. ............ 264/120 |
| 5,194,198 | A |   | 3/1993 | von Bonin et al. |
| 5,247,005 | A |   | 9/1993 | von Bonin et al. |
| 5,288,429 | A |   | 2/1994 | von Bonin et al. |
| 2002/0015779 | A1 | * | 2/2002 | Gallagher et al. ............... 427/8 |
| 2002/0166658 | A1 |   | 11/2002 | Norley et al. |
| 2002/0192457 | A1 | * | 12/2002 | Temme .................... 428/320.2 |
| 2003/0049378 | A1 | * | 3/2003 | Fong et al. .................... 427/337 |
| 2003/0082422 | A1 | * | 5/2003 | Koschany .................... 429/26 |

FOREIGN PATENT DOCUMENTS

| DE | 40 16 710 A1 | 11/1991 |
| DE | 41 17 074 A1 | 11/1992 |
| DE | 41 17 077 A1 | 11/1992 |
| JP | 2000 091 453 | 3/2000 |

* cited by examiner

*Primary Examiner*—James Sells
(74) *Attorney, Agent, or Firm*—Laurence A. Greenberg; Werner H. Stemer; Ralph E. Locher

(57) ABSTRACT

A process for the production of moldings of compressed expanded graphite includes producing three-dimensional moldings of compressed graphite expandate by bonding together two-dimensional pre-formed pieces of pre-compressed expanded graphite under the influence of pressure to provide single-piece moldings. A process for conducting, exchanging or storing heat using the moldings and a process for producing a heat storage device, are also provided.

21 Claims, 2 Drawing Sheets

PROCESS FOR PRODUCING MOLDINGS OF EXPANDED GRAPHITE, PROCESS FOR CONDUCTING, EXCHANGING OR STORING HEAT USING MOLDINGS AND PROCESS FOR PRODUCING A HEAT STORAGE DEVICE

BACKGROUND OF THE INVENTION

Field of the Invention

The present invention relates to a process for the production of moldings of expanded graphite, in particular moldings having a thickness of at least 50 mm. The invention also relates to a process for the conduction, exchange or storage of heat using the moldings and to a process for the production of a heat storage device.

German Published, Non-Prosecuted Patent Application DE 41 17 077 A1, corresponding to U.S. Pat. No. 5,288,429; German Published, Non-Prosecuted Patent Application DE 41 17 074 A1, corresponding to U.S. Pat. No. 5,247,005; and German Published, Non-Prosecuted Patent Application DE 40 16 710 A1, corresponding to U.S. Pat. No. 5,194,198, propose the production of three-dimensional moldings directly from pulverulent exfoliated graphite, in which either:
- exfoliatable graphite is expanded incompletely with the supply of moderate heat in a fluidized bed or actually in the final form, and the expansion is then brought to completion at elevated temperature in the mold, or
- exfoliatable graphite which has been incompletely expanded (pre-expanded) with the supply of moderate heat is pressed in a mold into a pre-formed piece, and the expansion is then brought to completion in the mold at a higher temperature, or
- a moist preparation of exfoliatable graphite is expanded in a mold with the supply of heat.

The final stage of the expansion therefore takes place in each case in the final form, and no compacting is provided for after completion of the expansion. The mold must on one hand be largely closed so that the geometry of the graphite body does not change during expansion, but must on the other hand permit the escape of air. The moldings obtained by that process should be dimensionally stable and have a homogeneous density. In the preferred variants of the aforementioned processes various additives and auxiliary substances, in particular binders, are added to the exfoliatable graphite.

Handling of partially expanded graphite powder is necessary in the process which proceeds by way of a pre-expansion step. The low bulk density (30 to 100 g/l in the Embodiment Examples of German Published, Non-Prosecuted Patent Application DE 40 16 710 A1, corresponding to U.S. Pat. No. 5,194,198) and the bulkiness of the particles make it difficult to fill molds completely with it, and dust pollution is high.

SUMMARY OF THE INVENTION

It is accordingly an object of the invention to provide a process for producing moldings of expanded graphite, a process for conducting, exchanging or storing heat using the moldings and a process for producing a heat storage device, which overcome the hereinafore-mentioned disadvantages of the heretofore-known processes of this general type and which provide three-dimensional moldings of compressed graphite expandate by way of an intermediate stage of two-dimensional semi-finished products or pre-formed pieces of incompletely compressed expanded graphite.

With the foregoing and other objects in view there is provided, in accordance with the invention, a process for producing moldings of compressed graphite expandate. The process comprises producing planar pre-formed pieces having a density of from 0.01 g/cm³ to 0.2 g/cm³ from graphite expandate having a density of from 2 g/l to 20 g/l. At least two of the pre-formed pieces are stacked on top of each other. The pre-formed pieces are bonded under the influence of pressure into a single-piece molding, while compressing the graphite under the influence of the pressure to a density of from 0.025 g/cm³ to 0.4 g/cm³.

With the objects of the invention in view, there is also provided a process for the conduction or exchange or storage of heat, which comprises conducting or exchanging or storing heat with a molding produced by the process according to the invention.

With the objects of the invention in view, there is additionally provided a process for the production of a heat storage device. The process comprises producing planar pre-formed pieces having a thickness of from 10 to 20 mm and a density of from 0.01 g/cm³ to 0.2 g/cm³ from graphite expandate having a density of from 2 g/l to 20 g/l. Upwardly-facing surfaces of the pre-formed pieces are coated with particles of a heat-storing material, while covering a maximum of 50% of the upwardly-facing surface of each pre-formed piece with particles of the heat-storing material. The pre-formed pieces are stacked on top of each other, with the coated surfaces facing upward. An uncoated pre-formed piece is laid onto the stack. The pre-formed pieces are bonded under the influence of pressure into a single-piece raw molding, while compressing the graphite expandate to a density of from 0.025 g/cm³ to 0.4 g/cm³. The raw molding is cut into the shape of a block.

Thus, the process according to the invention can be summarized as including the following steps:
- preparation of two-dimensional semi-finished products of graphite expandate, as an option having further additives, wherein the graphite expandate in the semi-finished product is only slightly compressed,
- stacking on top of each other the desired number (at least two) of semi-finished products or planar pre-formed pieces cut out from a semi-finished product,
- bonding of the semi-finished products or pre-formed pieces under the influence of pressure into a single-piece molding, and
- final shaping and further post-working as an option.

"Two-dimensional semi-finished products" or "planar pre-formed pieces" as used below are understood to be formed bodies having a thickness which is substantially less than their superficial extent, for instance flat slabs, disks, webs and similar planar formed bodies. Such two-dimensional semi-finished products can be created simply in a known manner by pressing the pulverulent starting material into a planar formed body, for example a flat strand, a web or a slab.

In accordance with the process according to the invention the transition from the formless powder to the complex three-dimensional molding need not be completed in one step. In terms of processing technology it is substantially less costly to convert a formless material, for example a powder or a slurry, initially into a simple form, for example that of a flat slab, than directly into a complex three-dimensional form. Moreover, in the process according to the invention the difficulties encountered in the prior art when charging dies with dusty powder, bulky particles or viscous masses do not occur.

A further advantage of the process according to the invention resides in the fact that, compared with the prior art single-stage process, the process according to the invention offers more opportunity for variation and optimization of the product parameters than the substantially single-stage prior art process, precisely because it includes a plurality of steps. Thus, different semi-finished products prepared in the first step can be combined in a multitude of ways, so that a multitude of different products is obtainable, for example by combining semi-finished products of different density and/or thickness and/or composition and/or coating. Other features which are considered as characteristic for the invention are set forth in the appended claims.

Although the invention is illustrated and described herein as embodied in a process for producing moldings of expanded graphite, a process for conducting, exchanging or storing heat using the moldings and a process for producing a heat storage device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
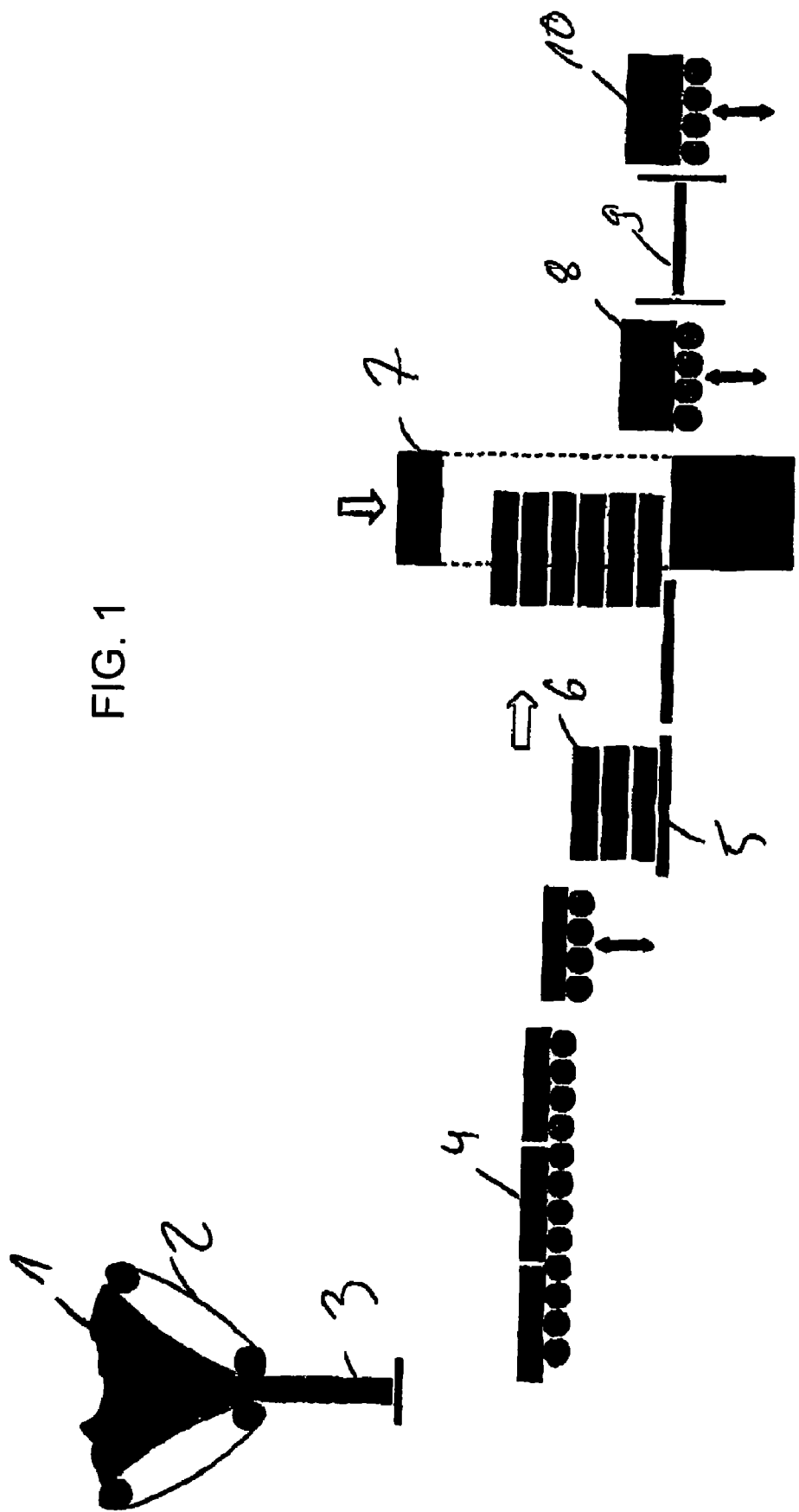
FIG. 1 is a flow diagram of a process according to the invention.

Referring now to the figures of the drawings in detail and first, particularly, to FIG. 1 thereof, there is seen a diagrammatic illustration of the way in which the process according to the invention is carried out.

The starting material for the process according to the invention is graphite expandate 1 (which is also referred to as exfoliated graphite). Fibrous or particulate additives or fillers of metal, carbon, ceramic materials or mineral materials can be added to the graphite expandate. These, for example, may be carbon black or other forms of carbon particles, to optimize the thermal and electrical conductivity, or fibers, for example carbon fibers or metallic fibers, and/or ceramic particles or mineral particles, for example of heat-storing substances. The selection of these materials is dictated by the intended use of the moldings which are to be prepared. The invention is not limited to the use of any particular fibrous or particulate additives.

The production of expanded graphite (graphite expandate, exfoliated graphite) is known, inter alia, from U.S. Pat. No. 3,404,061. Graphite intercalation compounds or graphite salts, for example graphite hydrogensulfate or graphite nitrate, are subjected to thermal shock, in order to prepare expanded graphite. In this case, the volume of the graphite particles increases by a factor of from 200 to 400, and the bulk density falls to 2 to 20 g/l. The so-called graphite expandate thus obtained is formed of worm-shaped or concertina or accordion-shaped, bulky aggregates. If these particles are compressed under pressure, they become entangled and interlocked with one another. Due to this effect, self-supporting planar formed bodies, for example continuous webs, sheetings or slabs, can be prepared without the addition of binder. Compression to provide sheetings having thicknesses of from 0.15 to 3 mm and densities of from 0.1 to 2 g/cm$^3$, preferably 0.7 to 1.8 g/cm$^3$, is in particular known. These sheetings are used, for example, as a sealing material.

However, in the semi-finished products for the process according to the invention, the graphite expandate is less strongly compressed than in the known graphite sheetings. It is crucial to the process according to the invention that the graphite expandate in the semi-finished product be compressed only to such an extent that, on one hand, a cohesion is brought about between the particles that is sufficient for the production of a planar semi-finished product, but on the other hand there still exists the possibility of an appreciable further compression. The graphite expandate, which has a density of 2 to 20 g/l, preferably 3 to 15 g/l, is compressed in the semi-finished product which has a density of from 0.01 to a maximum of 0.2 g/cm$^3$, preferably 0.02 to 0.1 g/cm$^3$. Due to this relatively low compression, it can be assumed that the expandate particles are still in part worm-shaped, so that in a subsequent compression step they are able to continue to become entangled and interlocked. Due to the low compression of the expandate, the semi-finished products have rough surfaces, unlike the smooth surfaces of the known graphite sheetings.

The semi-finished products are preferably prepared continuously by pressing between two textile conveyor belts 2 to form long stretched-out continuous webs 3. Pre-formed pieces 4 of appropriate size are then cut or stamped out from the planar semi-finished product which is thus obtained. The size, that is to say, the superficial extent, as well as the surface geometry of the pre-formed pieces 4, are substantially dictated by the product to be prepared. The process according to the invention sets no limits in these respects. For practical reasons, square slabs having a surface measuring from 100 mm×100 mm to 2,000 mm×2,000 mm are preferably used as the pre-formed pieces. However, circular, rectangular or differently shaped pre-formed pieces can naturally also be utilized.

A semi-finished product having the dimensions of the desired pre-formed piece 4, for example in the shape of a slab of a certain surface area and thickness, can naturally also be pressed directly from the graphite expandate. However, this variant is less preferable because of the discontinuous method of working as compared with the continuous preparation of flat strands or webs.

Suitable semi-finished products and pre-formed pieces prepared therefrom for the process according to the invention are between 4 and 45 mm, preferably between 5 and 40 mm thick. The use of thinner semi-finished products is not very economical, because the thinner the semi-finished product, the more pre-formed pieces of this semi-finished product must be stacked on top of each other in order to obtain a molding of a specified size. Semi-finished products which are substantially thicker than 55 mm are likewise unsuitable. During subsequent pressing together when the latter were stacked on top of each other, the very thick pre-formed pieces obtained from such a semi-finished product would themselves predominantly be deformed and compressed into themselves, and would in that case barely bond with the adjacent pre-formed pieces. There is consequently a risk that only a stack of thinner deformed pre-formed pieces of a higher density that barely adhere to one another would be obtained from a stack of thick pre-formed pieces of lower density that lie loosely on top of each other, instead of the desired single-piece molding. Moreover, the marked deformation of thick pre-formed pieces leads to material breaking out at the sides during pressing together.

The desired three-dimensional component is built up from these flat pre-formed pieces 4 by stacking the necessary number of flat pre-formed pieces 4 on top of each other on a multi-deck collecting device 5 to provide a stack 6. At least two pre-formed pieces are laid on top of each other. This stack 6 is then pressed together in a press 7, wherein the pre-formed pieces lying on top of each other bond together under the influence of pressure to provide a single-piece raw molding 8. The compression reserve which is still available in the semi-finished products is exploited during pressing together, so that the density rises to values of between 0.025 and 0.4 g/cm$^3$, preferably 0.03 to 0.25 g/cm$^3$.

The thickness (height) of the raw molding 8 obtainable by pressing together the stack 6 of pre-formed pieces 4 lying on top of each other is dictated by the number and thickness of the pre-formed pieces stacked on top of each other as well as by the pressure applied during pressing. The number of pre-formed pieces to be stacked on top of each other must take into account the volumetric shrinkage resulting from the compression. In other words, for example, when compression takes place to approximately half of the initial volume during pressing, the volume of the stack of pre-formed pieces must be approximately double that of the desired end product.

A particular advantage of the process according to the invention is that moldings having a thickness (in the direction of pressing) of more than 50 mm can also be prepared.

The pre-formed pieces stacked on top of each other that are to be bonded together need not necessarily be identical as to thickness, density and composition. On the contrary, the process according to the invention includes the possibility of combining pre-formed pieces of different thickness, density and/or composition in accordance with the desired properties of the molding to be prepared. In this way, for example, moldings can be prepared having a tailor-made spatial variation in composition.

The surfaces of individual pre-formed pieces or of all the pre-formed pieces can be provided in part with a coating, a cover, a deposit or an overlay. It is crucial to the invention that the graphite particles of the two pre-formed pieces be able to contact one another and interact, that is to say become entangled and interlocked with one another, over at least 50% of each interface between two pre-formed pieces.

Some of the pre-formed pieces to be bonded may, if this is necessary for the intended function of the molding to be prepared, be provided with an impregnation, for example with furan resin. This is advisable, for example, if the desired molding is to have layers with lower porosity and hence lower permeability, for example layers that act as a vapor barrier.

In the case of the application of moldings according to the invention as heat storage devices, individual pre-formed pieces may be impregnated with heat-storing substances, for example with phase-change materials that store latent heat, for example with paraffins or with aqueous solutions of salts which form hydrates and thus act as phase-change materials. Such phase-change materials and the action thereof are known to those skilled in the art. From 30 to 40% of the pore volume of the pre-formed piece is preferably filled by the impregnation.

No additional supply of heat is necessary for the pressing operation. The pressures applied are within the region of 10 to 500 bar (1 to 50 MPa). Stationary platen presses 7 can be used for pressing the pre-formed pieces together. The air displaced during compression can escape laterally from the platen press. However, continuously operating installations having pairs of rolls can also be utilized, for example calendering mills.

The raw moldings 8 thus obtained are durable and stable, and the individual flat pre-formed bodies are bonded together non-detachably. This is attributable to the fact that during pressing together of the pre-formed pieces stacked on top of each other the worms of the expandate from the adjacent pre-formed pieces, which are only slightly compressed, become entangled and interlocked across the interfaces between the individual pre-formed pieces. However, the invention is not tied to this theory. In any case, when the molding is cut open perpendicularly to the planes of the stacked pre-formed pieces, the boundaries between the originally individual pre-formed pieces are no longer visible at the cut faces in the finished molding. The number of pre-formed pieces from which the finished molding has been prepared is therefore no longer discernible from the finished molding.

If pressing together takes place in an open platen press, build-ups form on the lateral faces of the raw molding as a result of displacement of the material under the influence of the pressing force. These build-ups are subsequently removed by mechanical processing in a cutting station 9, and the raw moldings 8 are brought to the desired final form. It has been seen that the raw moldings 8 can be brought very simply into the desired shape, for example the shape of a block 10, by processing with a saw or a carpet knife.

In a post-working shaping operation the moldings can furthermore be provided, for example, with recesses and grooves, and undercuts can be worked from them, or patterns can be impressed into the surface, inter alia.

The operations of pressing and cutting can, however, also be undertaken in a combined installation, for example in a press having movable jaws at the front faces, which are moved down after pressing and thus cut off the edge build-ups.

Pressing close to final contours in a ventilatable die is also possible. However, this variant is less preferred due to the high tooling-up cost.

Different moldings obtained by the process according to the invention can be bonded together through the use of adhesives in order to obtain components having complex geometry. All of the known and generally widely used adhesives are suitable for this purpose.

Functional components can be pressed into the surfaces of the moldings, for example heating tubes for heating and air-conditioning technology applications.

Optional further finishing processes include, for example, the application of coatings to the surfaces of the moldings, for example by painting or by lamination with planar materials, for example wovens or other textile materials, and the impregnation of the moldings with certain substances, depending on the intended function of the moldings.

The conductivity of the moldings for heat and electrical current depends on the compression. The greater the compression, the higher the electrical and thermal conductivity and the more pronounced the anisotropy of the thermal and electrical conductivity. It is therefore possible to control the isotropy/anisotropy of the thermal and electrical conductivity by way of the compression.

An important field of application of the moldings according to the invention, in particular blocks, is air-conditioning and temperature control technology. Due to the thermal conductivity of graphite, the first application which presents itself in this respect is as thermal conductors, for example as heat dissipation bodies for electronic equipment, or as heat exchangers.

The thermal conductivity of graphite can furthermore be coupled with the heat storage capacity of a material which stores latent or sensible or noticeable heat in the moldings according to the invention, by introducing a heat-storing material into the moldings according to the invention. The graphite structure, as a result of its thermal conductivity, respectively facilitates the supplying of heat upon charging and the removal of heat upon discharging, of the storage device.

The moldings according to the invention can be readily impregnated or infiltrated with liquids. Heat storage devices can thus be prepared from the moldings obtained by the process according to the invention, by impregnation or infiltration with a heat storage or phase-change material, such as salt hydrate, dissolved in a solvent, preferably water, or with a phase-change material which can be converted into the liquid phase, such as paraffin. From 30 to 40% of the pore volume of the molding are preferably filled by the impregnation.

Alternatively, individual pre-formed pieces can be impregnated, as already described, and combined with non-impregnated pre-formed pieces to provide one molding.

Figure 2:
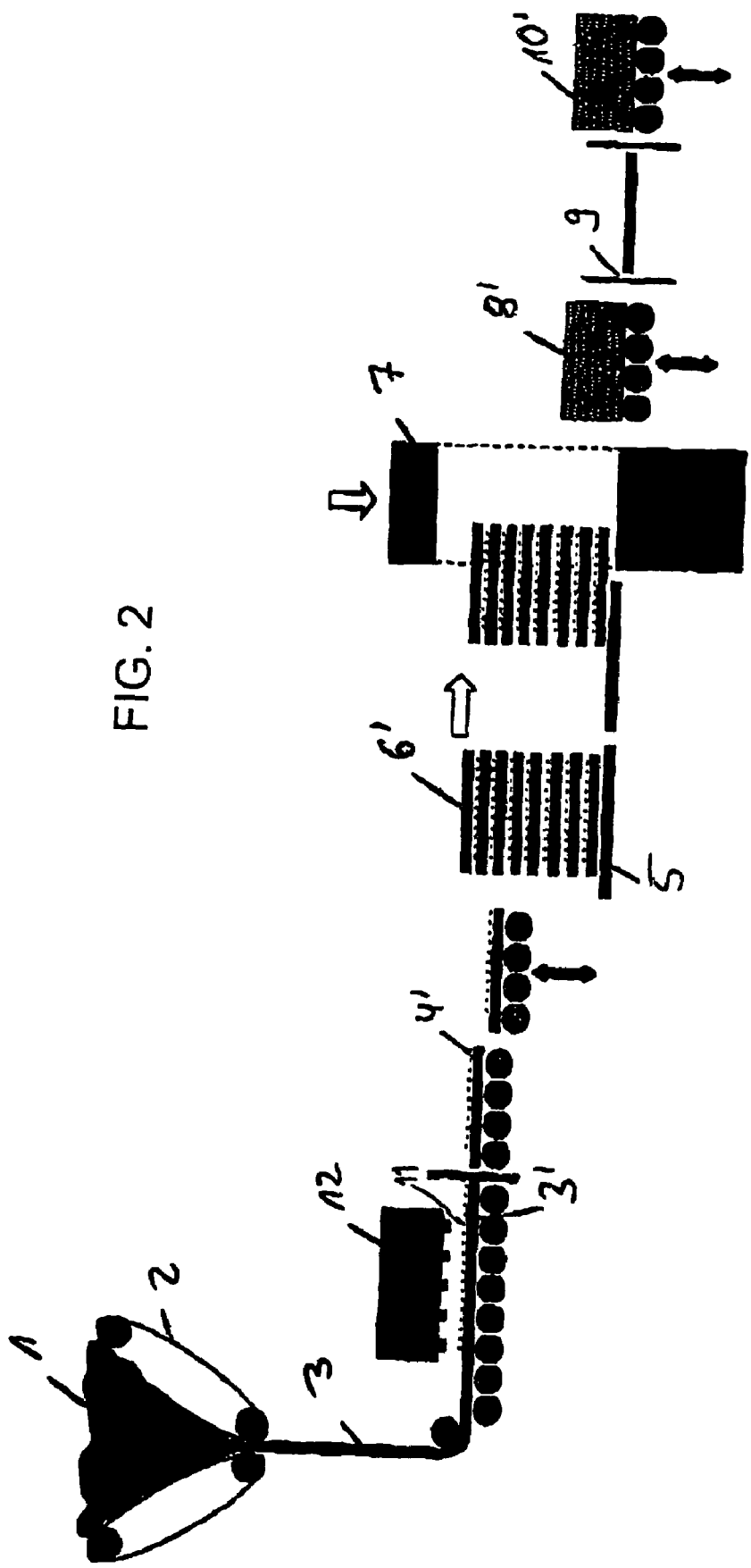
FIG. 2 is a flow diagram of the process according to the invention, with a semi-finished product of graphite expandate partially coated with a heat-storing material.

However, heat-storing materials that are present in solid form, for instance as a powder or granules, can also be introduced into the blocks according to the invention. FIG. 2 illustrates a method which is suitable therefor.

Graphite expandate 1 is pressed by the same method as in FIG. 1 between textile conveyor belts 2 to provide a web 3. A pulverulent or granular heat-storing material 11, for example magnesite or barite, is then distributed from a metering device 12 in a planar manner to provide a thin, loose layer on an upwardly-facing surface of the web 3. The grains or granular particles typically have diameters of between 0.5 and 5 mm. Slab-shaped pre-formed pieces 4' which are then cut out from the sprinkled web 3' in the cutting station, are stacked on top of each other on a multi-deck collecting device 5 to provide a stack 6' and are pressed together in a stationary press 7. Alternatively, slabs 4 can also be cut out initially from the web 3, and their upwardly-facing surfaces can then be sprinkled with the heat-storing material 11.

It is crucial to the cohesion of the composite that the sprinkled-on layer is not so thick and compact that it separates the surfaces of the adjoining graphite slabs completely from one another in the stack. An interaction between the slab surfaces must still be possible through the powder bed, so that during pressing, the entanglement and interlocking of the graphite expandate particles among one another occurs, which is crucial to the mutual adhesion of the slabs. The covering of the surface of each pre-formed piece with the sprinkled-on particles must not therefore exceed 50%. The strewn particles are therefore preferably not applied so as to be distributed over the total surface of the pre-formed piece, but only on certain regions, for example in channels or other indentations previously introduced into the surface and disposed in a suitable pattern. These channels or indentations can be cut out of the surface with a cutting tool or pressed in with a stamp-type tool.

When the stack 6' is pressed together, the sprinkled-on particles are pressed from the slab surface into those regions of the slabs which are near the surface, so that no sharply separated discrete layers of graphite or of the poured-on powder are discernible in a cross-section of the body.

The separation between graphite layers and layers containing heat-storing material can be further reduced if the thinnest possible pre-formed pieces are used, because the thinner the pre-formed pieces, the thinner the graphite layers between the layers which contain the heat-storing material. Pre-formed pieces having a thickness of from 10 to 20 mm are preferably used for the production of blocks having heat-storing intermediate layers. In this way a less heterogeneous product having transitional regions between the individual layers can be obtained from heterogeneous semi-finished products built up by having discrete layers (of a graphite pre-formed piece with sprinkled-on powder or granules).

In the same way as for the moldings 8, the thus obtained raw moldings 8' charged with the heat-storing material are then brought to the desired shape, for example the shape of a block 10', in a cutting station 9.

It is clear that the process according to FIG. 2 is not confined to the production of heat-storing intermediate layers. Moldings having other functional layers can also be prepared by applying particles of a corresponding functional material to the upward-facing surface of the semi-finished product or the pre-formed pieces. It is crucial for the production of the molding according to the invention that a maximum of 50% of the upward-facing surface of each pre-formed piece be covered by the particles of the functional material.

Further variants of the process according to the invention reside in inserting plies of perforated plate, punched sheeting, open woven, knit or other wide-meshed planar formed bodies of textile into the stacks 6 or 6' between the individual pre-formed pieces 4 or 4'. Wovens having mesh sizes of between 3 mm×3 mm and 20 mm×20 mm are, for example, suitable. Plies of wovens introduced between the graphite layers bring about an improvement in the mechanical stability, in particular the flexural strength, of the moldings.

It is crucial that the intermediate plies do not cover the surfaces of the pre-formed pieces completely, in order to ensure that an interaction between the slab surfaces is still possible, so that during pressing the graphite expandate particles become entangled and interlocked with one another across the slab boundaries. The extent to which each boundary surface between the pre-formed pieces is covered by an overlay or other types of coatings or deposits should not therefore exceed 50% of the total surface area.

Where the substances introduced between the pre-formed pieces are fusible or thermoplastic (for example punched plastics sheeting) or contain fusible or thermoplastic constituents, for example plastics fibers, the pressing operation can be undertaken at elevated temperature in order to achieve a softening, partial melting or melting of these substances. According to the invention, however, this is not necessary in order to bring about adhesion between the slab surfaces. Nevertheless, as a result of melting, those layers of the pre-formed pieces which are close to the surface can be infiltrated with the molten substance, so that the molding obtained has continuous transitions between the graphite layers and the intermediate layers.

It should, finally, be emphasized again that impregnation, infiltration and the introduction of intermediate layers serve only to impart to the moldings according to the invention certain functions necessary for their use, for example for heat storage. The materials which are introduced as intermediate layers or through the use of impregnation do not have to fulfill any gluing, binding or adhesive function, because in the moldings according to the invention the pre-formed pieces adhere to one another without binders or glues due to the effects of mutual entanglement and interlocking of the graphite expandate particles across the boundary surfaces of the pre-formed pieces, which effects are achieved by pressing together.

EMBODIMENT EXAMPLES

In the Embodiment Examples of the process according to the invention, slab-shaped pre-formed pieces are stacked on top of each other and pressed together in a platen press to provide a raw molding which is cut to provide a block. A block is understood herein to be a cubic or cuboid body. The pre-formed pieces were prepared from graphite expandate having a density of 3 g/l. Unless otherwise indicated, the pressing operation took place at room temperature. The "thickness" of the pre-formed pieces or the "thickness/height" of the blocks always means the dimension in the direction of pressing.

Examples 1 to 4

Preparation of 50 mm Thick Blocks

A block (Example 1) having a height (thickness) of 50 mm and a density of 0.15 g/cm$^3$ was prepared by stacking on top of each other 8 slab-shaped pre-formed pieces each having a thickness of 20 mm, a density of 0.025 g/cm$^3$ and an area of 500 mm*250 mm, and pressing them together at a pressure of 200 bar (20 MPa). The built-up side faces were then cut off the raw formed piece. As a result, the length and breadth of the basal or base area of the block were reduced in each case by 20 mm in comparison with the area of the semi-finished products. The block was cut open in the direction of pressing, the cut faces were homogeneous and the original interfaces between the pre-formed pieces were no longer discernible.

In Examples 2 to 4 which follow, blocks each having a height (thickness) of 50 mm were made from slab-shaped semi-finished products having an area of 400 mm×600 mm. In each case a plurality of semi-finished products of the same thickness and density were stacked on top of each other and pressed together to make the blocks. The built-up side faces were then cut off the raw formed piece. As a result, the length and breadth of the basal area of the block were reduced in each case by 20 mm in comparison with the area of the semi-finished products.

Table 1 indicates the thickness and density of the blocks obtained by the process according to the invention, in dependence on the number of semi-finished products stacked on top of each other, their thickness and density.

TABLE 1

| No. | Number of slab-shaped pre-formed pieces | Thickness of slab-shaped pre-formed pieces/mm | Density of graphite in slab-shaped pre-formed pieces/g/cm$^3$ | Thickness (=height) of block/mm | Density of graphite in block/g/cm$^3$ |
|---|---|---|---|---|---|
| 2 | 2 | 35 | 0.055 | 50 | 0.084 |
| 3 | 5 | 35 | 0.055 | 50 | 0.220 |
| 4 | 4 | 35 | 0.027 | 50 | 0.095 |

It is apparent from Table 1 that the material density in the block is dependent on the number of semi-finished products and their density. It is thus possible to achieve certain densities in a targeted manner by appropriate selection of the semi-finished products. This is attractive for the adjustment of certain values and anisotropies of the thermal conductivity, because they depend on the compression.

A comparison between blocks Nos. 2 and 3 shows that, for the same block thickness, as well as the same density and thickness of the semi-finished products, the density of the graphite in the block is greater the more semi-finished products were stacked on top of each other and pressed together.

Example 5

Blocks Having Heat-Storing Intermediate Layers

A block was prepared by the process according to the invention from four slabs stacked on top of each other, each having an area of 300 mm×300 mm, a thickness of 40 mm and a density of 0.02 g/cm$^3$. The upwardly-facing surfaces of three of the four slabs were each sprinkled with 100 g of granular barite (grain size approximately 1 mm) so that a loose planar distribution of the grains was obtained on the slab surface, i.e. the surface was not covered completely. Barite serves as a storage material for sensible heat.

The three sprinkled slabs were then stacked on top of each other, the fourth slab, which was not sprinkled, was laid uppermost on the stack, and the stack was pressed together to a height of 40 mm at a pressure of 150 bar (15 MPa) at room temperature. The block thus obtained contained three heat-storing intermediate layers, with the transition to the respectively adjacent graphite layers being continuous, because the grains of the heat-storing material were pressed into the slab surfaces during pressing together. The high thermal conductivity of the graphite layers between the heat-storing layers permits respective rapid heating and cooling of the heat storage device.

Example 6

Blocks Having Reinforcing Inserts Between the Semi-Finished Products

A block was prepared by the process according to the invention from five slabs stacked on top of each other, each having a surface of 200 mm×200 mm, a thickness of 40 mm and a density of 0.02 g/cm$^3$. Plies of a fusible plastics fiber woven material, having a mesh size of 3 mm×3 mm, were inserted in each case between the slabs when stacking them on top of each other, so that a stack having an alternating configuration of graphite slabs and woven plies was obtained. The stack was pressed together at a temperature of 180° C. and at a pressure of 200 bar (20 MPa) to provide a block having a thickness of 40 mm.

Example 7

Density-Dependence of the Level and the Anisotropy of the Thermal and Electrical Conductivity of the Semi-Finished Products It is apparent from a comparison of different pre-formed pieces (Table 2) that both the level as well as the anisotropy of the thermal and electrical conductivity of the semi-finished products are dependent on density. The greater the compression, the flatter and more planar the graphite particles and the more parallel their orientation to the slab plane. For this reason, the ratio of the conductivity in the slab plane to the conductivity at right angles to the slab plane rises with increasing density.

Examples 8 and 9

Density-Dependence of the Level and the Anisotropy of the Thermal and Electrical Conductivity of the Blocks The dependence of the level and the anisotropy of the electrical and thermal conductivity on the compression of the graphite, which was already demonstrated in the previous Example using semi-finished products of differing density, can also be observed in the case of the blocks prepared by the process according to the invention. This is shown by a comparison of two blocks of different density in Table 3. Each block was prepared by the process according to the invention from semi-finished products of the same density and thickness stacked on top of each other.

TABLE 2

| | Semi-finished product No. | | | | |
|---|---|---|---|---|---|
| | 1 | 2 | 3 | 4 | 5 |
| Thickness/mm | 6 | 30 | 25 | 20 | 10 |
| Density/g/cm³ | 0.02 | 0.03 | 0.04 | 0.06 | 0.13 |
| Thermal conductivity/ W/mK | | | | | |
| in the x-direction | | 4.2 | 6.1 | 6.8 | 9.9 |
| in the y-direction | | 3.5 | 4.1 | 5.8 | 11.1 |
| in the z-direction | | 3.0 | 3.2 | 3.6 | 5.1 |
| Electrical resistance/ Ohm * μm | | | | | |
| in the x-direction | 843 | 475 | 405 | 268 | 148 |
| in the z-direction | 957 | 640 | 480 | 500 | 233 |

TABLE 3

| | Block No. | |
|---|---|---|
| | 8 | 9 |
| Block thickness (=height)/mm | 140 | 43 |
| Density of graphite in the block/g/cm³ | 0.03 | 0.14 |
| Number of semi-finished products | 5 | 2 |
| Thickness per semi-finished product/mm | 40 | 40 |
| Density of graphite in the semi-finished products/g/cm³ | 0.02 | 0.024 |
| Thermal conductivity/W/mK | | |
| in the x-direction | 3.3 | 12.6 |
| in the y-direction | 3.0 | 15.5 |
| in the z-direction | 2.4 | 4.2 |
| Electrical resistance/Ohm * μm | | |
| in the x-direction | 500 | 105 |
| in the z-direction | 575 | 340 |

This application claims the priority, under 35 U.S.C. § 119, of European Patent Application 04 009 091.2, filed Apr. 16, 2004; the entire disclosure of the prior application is herewith incorporated by reference.

We claim:

1. A process for producing moldings of compressed graphite expandate, which comprises the following steps:
    producing planar pre-formed pieces having a density of from 0.01 g/cm³ to 0.2 g/cm³ from graphite expandate having a density of from 2 g/l to 20 g/l;
    stacking at least two of the pre-formed pieces on top of each other; and
    bonding the pre-formed pieces under the influence of pressure into a single-piece molding, while compressing the graphite under the influence of the pressure to a density of from 0.025 g/cm³ to 0.4 g/cm³; and
    impregnating the molding obtained by the bonding of the pre-formed pieces under the influence of pressure with a heat-storing material in the from of a paraffin acting as a phase-change material.

2. The process according to claim 1, which further comprises pressing together the pre-formed pieces, being stacked on top of each other, at a pressure within a range of 1 to 50 MPa.

3. The process according to claim 1, wherein the pre-formed pieces have a thickness of at least 4 mm and at most 45 mm.

4. The process according to claim 1, wherein the graphite expandate from which the pre-formed pieces are produced has a density of from 3 to 15 g/l.

5. The process according to claim 1, wherein the graphite in the pre-formed pieces has a density of from 0.02 to 0.1 g/cm³.

6. The process according to claim 1, wherein the graphite in the moldings has a density of from 0.03 to 0.25 g/cm³.

7. The process according to claim 1, wherein the molding has a thickness in a pressing direction of at least 50 mm.

8. The process according to claim 1, wherein the graphite expandate contains fibrous or particulate additives of metal, carbon, ceramic materials or mineral materials.

9. The process according to claim 8, which further comprises adding particles of a heat-storing material to the graphite expandate.

10. A process for producing moldings of compressed graphite expandate, which comprises the following steps:
    producing planar pre-formed pieces having a density of from 0.01 g/cm³ to 0.2 g/cm³ from graphite expandate having a density of from 2 g/l to 20 g/l;
    stacking at least two of the pre-formed pieces on top of each other:
    bonding the pre-formed pieces under the influence of pressure into a single-piece molding, while compressing the graphite under the influence of the pressure to a density of from 0.025 g/cm³ to 0.4 g/cm³;
    individually providing surfaces of at least one of the pre-formed pieces partially with a coating, a cover, a deposit or an overlay, covering a maximum of 50% of each interface between the pre-formed pieces with the coating, cover, deposit or overlay; and
    covering upwardly-facing surfaces of at least individual pre-formed pieces in the stack with a powder or granules having powder particles or granule particles covering a maximum of 50% of the upwardly-facing surfaces of the pre-formed piece.

11. The process according to claim 10, which further comprises covering the upwardly-facing surfaces of at least individual pre-formed pieces in the stack with a pulverulent or granular heat-storing material having powder particles or granule particles covering a maximum of 50% of the upwardly-facing surface of the pre-formed piece.

12. The process according to claim 10, which further comprises forming indentations in the upwardly-facing surfaces of at least individual pre-formed pieces in the stack, introducing the pulverulent or granular material into the indentations, and covering a maximum of 50% of the upwardly-facing surface of the pre-formed piece with the powder particles or granule particles.

13. The process according to claim 10, which further comprises overlaying the surfaces of at least individual pre-formed pieces with a planar textile material, a perforated plate or a punched sheeting, and covering a maximum of 50% of each interface between the pre-formed pieces with the textile material.

14. The process according to claim 13, wherein the textile material is a woven material having a mesh size of between 3 mm×3 mm and 20 mm×20 mm.

15. The process according to claim 10, wherein the coating, cover, deposit or overlay contains fusible or thermoplastic constituents and the step of bonding the pre-formed pieces takes place under pressure at or above a softening or melting point thereof.

16. The process according to claim 1, wherein the pre-formed pieces are semi-finished products stacked on top of each other and differing from one another in at least one of density, thickness, composition and coating.

17. The process according to claim 1, which further comprises alternatingly stacking pre-formed pieces of graphite expandate and overlays of planar textile materials, perforated plate or punched sheeting on top of each other, covering a maximum of 50% of each interface between the pre-formed pieces with the coating, cover, deposit or overlay, and then bonding under the influence of pressure into a single-piece molding.

18. The process according to claim 1, which further comprises carrying out the bonding of the pre-formed pieces under pressure in a platen press, a ventilatable pressing die or between pairs of rolls.

19. The process according to claim 1, which further comprises bringing the molding obtained by the bonding of the pre-formed pieces under the influence of pressure, into a desired final form by mechanical processing.

20. The process according to claim 1, which further comprises coating surfaces of the molding with a finish or with a lamination of a planar textile material.

21. A process for the production of a heat storage device, which comprises the following steps:
  producing planar pre-formed pieces having a thickness of from 10 to 20 mm and a density of from 0.01 $g/cm^3$ to 0.2 $g/cm^3$ from graphite expandate having a density of from 2 g/l to 20 g/l;
  coating upwardly-facing surfaces of the pre-formed pieces with particles of a heat-storing material, while covering a maximum of 50% of the upwardly-facing surface of each pre-formed piece with particles of the heat-storing material;
  stacking the pre-formed pieces on top of each other, with the coated surfaces facing upward;
  laying an uncoated pre-formed piece onto the stack;
  bonding the pre-formed pieces under the influence of pressure into a single-piece raw molding, while compressing the graphite expandate to a density of from 0.025 $g/cm^3$ to 04 $g/cm^3$; and
  cutting the raw molding into the shape of a block.

* * * * *